(12) United States Patent
Kropp et al.

(10) Patent No.: US 9,135,767 B2
(45) Date of Patent: *Sep. 15, 2015

(54) CARPET CLEANING MACHINE RENTAL KIOSK

(71) Applicant: Rug Doctor, Inc., Plano, TX (US)

(72) Inventors: David A. Kropp, Plano, TX (US); Timothy J. Wall, Plano, TX (US); Michael E. Shin, Gaithersburg, MD (US)

(73) Assignee: Rug Doctor, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,864

(22) Filed: Jun. 11, 2013

(65) Prior Publication Data

US 2013/0270979 A1 Oct. 17, 2013

Related U.S. Application Data

(62) Division of application No. 13/303,807, filed on Nov. 23, 2011, now Pat. No. 8,483,871.

(60) Provisional application No. 61/416,797, filed on Nov. 24, 2010.

(51) Int. Cl.
*G06F 17/00* (2006.01)
*G07F 7/00* (2006.01)
*G06Q 10/00* (2012.01)

(52) U.S. Cl.
CPC ................ *G07F 7/005* (2013.01); *G06Q 10/00* (2013.01)

(58) Field of Classification Search
CPC ....................................................... G07F 7/005

USPC .................. 700/231, 232, 236, 237, 241–243
See application file for complete search history.

(56) References Cited

U.S. PATENT DOCUMENTS

| | | | |
|---|---|---|---|
| 3,220,528 A | 11/1965 | Friedrich | |
| 4,803,348 A | 2/1989 | Lohrey et al. | |
| 5,205,436 A | 4/1993 | Savage | |
| 6,644,455 B2* | 11/2003 | Ichikawa | 194/205 |
| 6,866,195 B2* | 3/2005 | Knowles et al. | 235/385 |
| 7,086,558 B1* | 8/2006 | Pixley et al. | 221/9 |
| 7,317,393 B2* | 1/2008 | Maloney | 340/568.1 |
| 7,337,963 B2* | 3/2008 | Harper et al. | 235/385 |
| 7,765,026 B2 | 7/2010 | Sheppard et al. | |
| 8,483,871 B2* | 7/2013 | Kropp et al. | 700/237 |
| 8,570,169 B2* | 10/2013 | Green et al. | 340/540 |

(Continued)

FOREIGN PATENT DOCUMENTS

DE 3336619 A1 4/1985

*Primary Examiner* — Michael K Collins
(74) *Attorney, Agent, or Firm* — Thompson Coburn LLP

(57) ABSTRACT

A self-service kiosk enables customers to conduct rental transactions for carpet cleaning machines without the need of assistance from store personnel. The kiosk comprises a housing having several stalls or bays that hold and display carpet cleaning machines and carpet cleaning accessories for rental. The kiosk controls whether such carpet cleaning machines and carpet cleaning accessories can be removed from or returned to the kiosk. The kiosk also optionally includes a control panel for conducting a rental transaction. The self-service kiosk may also include automatic dispensing of cleaning products purchased by the customer at the kiosk. Still further, the self-serve kiosk may include shelving for holding cleaning products that can be purchased separately at a checkout counter.

7 Claims, 4 Drawing Sheets

(56) References Cited

U.S. PATENT DOCUMENTS

| | | |
|---|---|---|
| 2001/0041987 A1 | 11/2001 | Ichikawa |
| 2003/0078852 A1 | 4/2003 | Shoen et al. |
| 2004/0249648 A1 | 12/2004 | Rosler et al. |
| 2004/0267640 A1 | 12/2004 | Bong et al. |
| 2005/0165612 A1 | 7/2005 | Van Rysselberghe |
| 2005/0279579 A1 | 12/2005 | Milk et al. |
| 2006/0080063 A1 | 4/2006 | Vaughn |
| 2008/0100416 A1* | 5/2008 | Harper et al. .......... 340/5.7 |
| 2008/0215505 A1 | 9/2008 | Reynolds |
| 2012/0130535 A1* | 5/2012 | Kropp et al. .......... 700/236 |

* cited by examiner

CARPET CLEANING MACHINE RENTAL KIOSK

CROSS-REFERENCE TO RELATED APPLICATIONS

This application is a divisional of U.S. Ser. No. 13/303,807, filed Nov. 23, 2011, and which claims priority to U.S. Provisional Patent App. No. 61/416,797, filed Nov. 24, 2010.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention is directed to a kiosk that stores and displays several carpet cleaning machines for rental by customers. More specifically, the present invention is directed to a self-service kiosk that stores and displays carpet cleaning machines and has a control panel that is operable by a customer to conduct a rental transaction for one of the carpet cleaning machines, whereby the kiosk releases one of the carpet cleaning machines to the customer after the rental transaction is made.

2. General Background

Carpet cleaning machines have been available for renting from stores such as hardware stores and grocery stores for many years. Typically, a customer will enter the store and meet with personnel of the store to discuss renting a carpet cleaning machine. The customer and the store personnel typically exchange information regarding the period of time for which the carpet cleaning machine is desired to be rented, the cost for renting the carpet cleaning machine for that period of time, the identification information of the customer, the manner in which payment will be made for the rental and the payment for the rental. The customer will fill out a paper form documenting the rental transaction. The store personnel will then typically provide the customer with the rented carpet cleaning machine. The customer will then often select cleaning products to be used with the rented machine from the store shelves and purchase the products through the store cash register.

At the end of the rental period the customer then returns the carpet cleaning machine to the store and presents the returned machine to store personnel. The store personnel will then typically review the rental transaction made earlier to determine if the terms of the transaction have been complied with. The store personnel will then charge any additional fees if needed, for example if the rental period had extended beyond the rental period of the original transaction, and complete the rental transaction with the customer. The store personnel will then return the machine to a storage rack.

SUMMARY OF THE INVENTION

The prior art method of renting a carpet cleaning machine from a store is disadvantaged in that it involves interaction of a customer with store personnel. If store personnel for the rental transaction are not immediately available to discuss the transaction with the customer, the customer may leave the store and seek to rent a carpet cleaning machine from another store. This results in the loss of rental fees that could have been received by the first store visited by the customer. The customer is also required to take the time to fill out a paper form documenting the rental transaction. Additionally, the need for store personnel to discuss the rental transaction with the customer removes that store personnel from performing other tasks in the store. This results in a cost to the store to provide personnel to discuss the rental transaction.

The above and other disadvantages associated with the prior methods of renting carpet cleaning machines from stores are overcome by the carpet cleaning machine rental kiosk of the present invention.

The kiosk of the present invention is a self-service kiosk that enables the customer to conduct a rental transaction without the need of assistance from store personnel. The kiosk is comprised of a housing having several stalls or bays that hold and display carpet cleaning machines and carpet cleaning accessories for rental, and a control panel for conducting a rental transaction. The self-service kiosk may also include automatic dispensing of cleaning products purchased by the customer at the kiosk. Still further, the self-serve kiosk may include shelving for holding cleaning products that can be purchased separately at a checkout counter.

The control panel of the kiosk communicates with a control system of the kiosk. The control panel captures customer identification information, cleaning machine rental information and payment information. It is not necessary for the customer to complete a paper rental form. The kiosk receives customer information immediately as it is entered electronically. Preferably there is no data related to any particular rental transaction in the store in hard copy form, nor does the store need such data. To receive the customer information and complete a transaction, the control panel may be provided with features such as a keyboard and an information display or a touch screen monitor, a credit card scanner, a cash scanner, a change return slot, and a printer for printing out a receipt of the rental transaction and terms and conditions of the transaction on the receipt. The control panel may also be provided with a wireless receiver such as a Bluetooth or Wi-Fi adapter or a RFID receiver for obtaining customer information in a touchless manner.

At least some of the stalls of the kiosk initially contain a carpet cleaning machine. Some stalls may also contain one or more accessories for a carpet cleaning machine, such as flexible vacuum hoses and vacuum hose attachments. Each stall preferably has a retaining mechanism such as a front gate or door that prevents any carpet cleaning machine or accessory item from being removed from the stall until a rental transaction occurs. When the rental transaction is completed and approved by the kiosk control system, a gate or door closing over the front of one of the kiosk stalls is unlocked by the control system, thereby allowing the customer to open the gate or door and remove the carpet cleaning machine or other item from the stall. Each stall preferably also comprises one or more infrared scanning beams or other detection device to identify when a cleaning machine or other item has been removed from the unlocked stall. After the removal of the cleaning machine or other item is detected, the respective gate or door may be locked by the control system to prevent other items from being removed from the stall.

When the rental period for the carpet cleaning machine is complete, the customer returns the machine to the kiosk. At least some of the customer information is then re-entered into the control panel of the kiosk such that the appropriate rental transaction information can be retrieved by the control system of the kiosk. The gate or door of the stall from which the carpet cleaning machine was removed is then controlled by the kiosk to open, allowing the customer to return the carpet cleaning machine to a stall of the kiosk. When the carpet cleaning machine is positioned back in the stall as detected by the detection device and the door has been closed, the rental transaction is terminated, and the stall gate or door is locked by the control system, thereby locking the machine in the stall.

The control system of the kiosk communicates via telephone, Internet, Wi-Fi, or some other known communication system with a remote data processing system that monitors each of a plurality of different kiosks positioned at different geographic locations. The communication may occur during each rental transaction, after each transaction, periodically, or at random times. The communication may also be one way (from the kiosk to the remote data processing system) or bi-directional.

One aspect of the invention is directed to a self-service carpet cleaning machine rental kiosk that comprises a plurality of storage stalls, a control system, at least one detection device, and a communication system. At least some of the storage stalls are each configured and adapted to contain at least one carpet cleaning machine. At least one of the storage stalls comprises at least one retaining mechanism that is configured and adapted to selectively prevent and allow the removal of a carpet cleaning machine from the kiosk. The control system comprises at least one user input device that is configured and adapted to receive rental data from a customer. The control system is operatively connected to the retaining mechanism in a manner such that the control system can activate the retaining mechanism to allow a carpet cleaning machine to be removed from the at least one of the storage stalls. The detection device is adapted and configured to detect when a carpet cleaning machine has been removed from a stall of the kiosk. The detection device is also operatively connected to the control system in a manner such that the control system is responsive to whether a carpet cleaning machine has been removed from the at least one of the storage stalls of the kiosk. The communication system is operatively connected to the control system and is adapted and configured to communicate with a remote processing system.

Another aspect of the invention is directed to a method of leasing carpet cleaning machines, the method comprising providing a kiosk. The kiosk comprises a control system, a communication system, at least one storage stall, at least one carpet cleaning machine, and at least one retaining mechanism. The control system comprises at least one user input device that is configured and adapted to receive rental data from a customer. The retaining mechanism is configured and adapted to selectively prevent and allow the removal of the carpet cleaning machine from the storage stall. The method also comprises permitting a customer to enter rental data into the kiosk using the input device. Still further, the method comprises using the control system to activate the retaining mechanism in a manner such that the retaining mechanism allows the removal of the carpet cleaning machine from the storage stall of the kiosk in response to the entered rental data. Additionally, the method comprises permitting the customer to enter return data into the kiosk using the input device and using the control system to activate the retaining mechanism in a manner such that the retaining mechanism initially allows the customer to return the carpet cleaning machine to the stall and thereafter prevents the removal of the carpet cleaning machine from the stall in response to the return data. The method also comprises transmitting data that is dependent upon the rental data to a remote processing system via the communication system.

As can be appreciated from the foregoing, the kiosk of the present invention has many benefits. The kiosk provides improved theft control information. Additionally, the kiosk control system can store data indicative of the number of machines in stock and out on rent, or such information can be determined from the data transmitted by the kiosk to the remote data processing system, enabling a quick response if a kiosk runs out of machines. The control system may also monitor broken machines or broken components of the kiosk itself so they can be replaced in a timely manner. Still further, the payment for a rental is received the day of the rental, versus an average of five to six weeks in the conventional rental process.

Further features of the carpet cleaning machine rental kiosk of the invention are set forth in the following detailed description of the kiosk and in the drawing figures.

Figure 1:
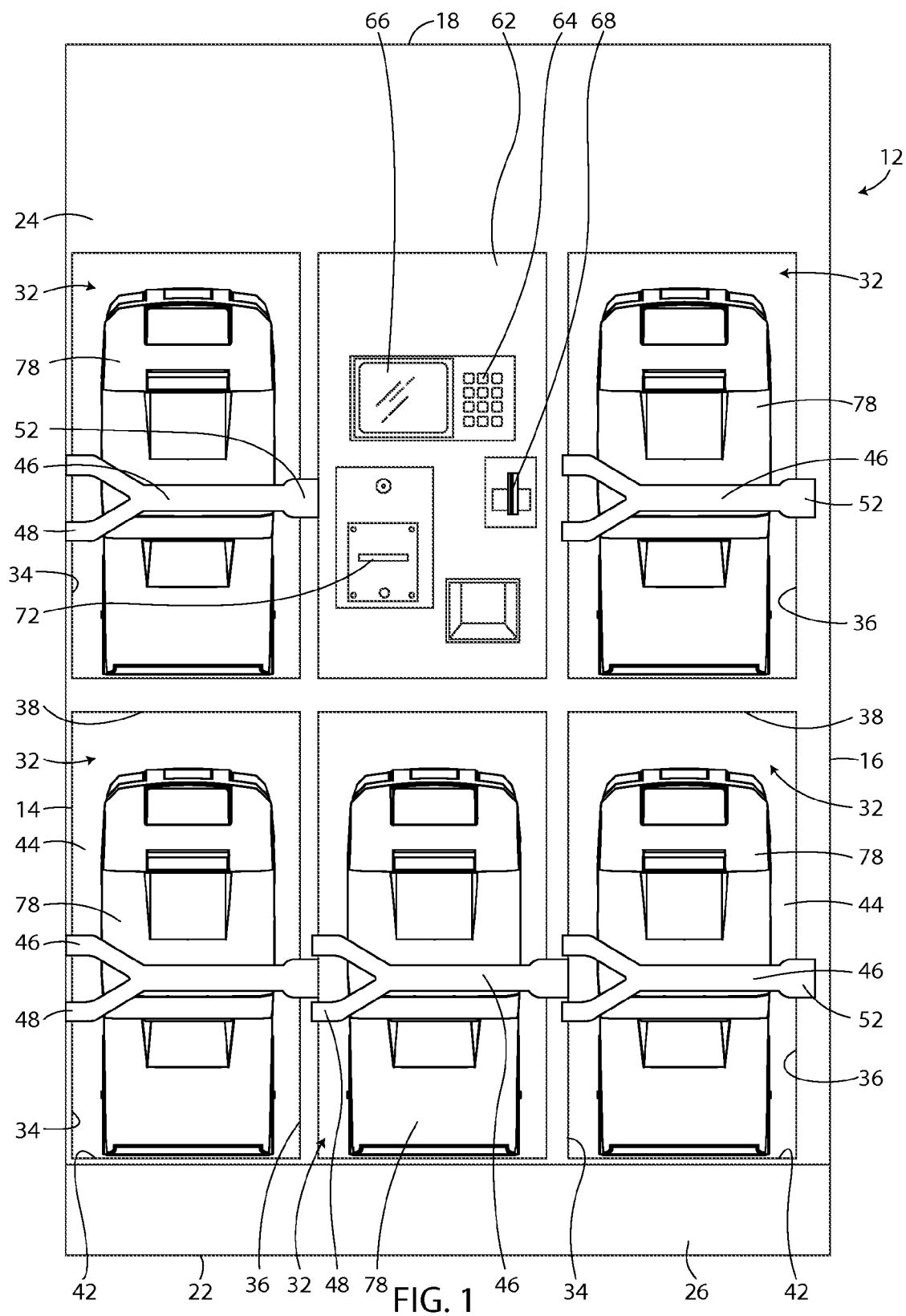
FIG. 1 shows a front elevation view of one embodiment of the carpet cleaning machine rental kiosk.

Reference numerals in the written specification and in the drawing figures indicate corresponding items.

DETAILED DESCRIPTION

FIG. 1 is a front elevation view of a carpet cleaning machine rental kiosk 12 in accordance with the invention. The kiosk 12 is basically constructed as a self-contained structure enclosed in a housing. The housing has left 14 and right 16 side walls, a back wall (not seen in FIG. 1), top 18 and bottom 22 walls and an upper front wall section 24 and a lower front wall section 26. The housing of the kiosk 12 basically contains all of the control systems of the self-service kiosk as well as an electronic communication system (not shown) that enables the kiosk to communicate rental transactions to a remote processing system that monitors each rental transaction conducted at the kiosk. The remote processing system also monitors rental transactions of other kiosks at other geographic locations. The communication system can be any type of electronic communication system including, but not limited to, a telecommunication system, an internet communication system, or a Wi-Fi communication system.

A plurality of stalls or bays 32 are provided in the front of the kiosk 12. The stalls 32 are basically rectangular enclosures that have opposite side walls 34, 36, opposite top 38 and bottom 42 walls, and a rear wall 44. The front of each stall 32 is opened except for a gate or door 46 that extends across the front of the stall 32. The gate 46 has a hinge 48 at one end of the gate that allows the gate to be pivoted between a closed position of the gate shown in FIG. 1, and an opened position of the gate where the gate 46 is pivoted away from the front of the stall 32 allowing access to the interior of the stall. The opposite end of the gate 46 has a lock 52 that holds the gate 46 in its closed position shown in FIG. 1. When the gate lock 52 is unlocked by the control system of the kiosk 12, a customer can then pivot the gate 46 to move the gate to an open position where it is displaced away from the front of the stall 32, providing access to the interior of the stall.

Figure 2:
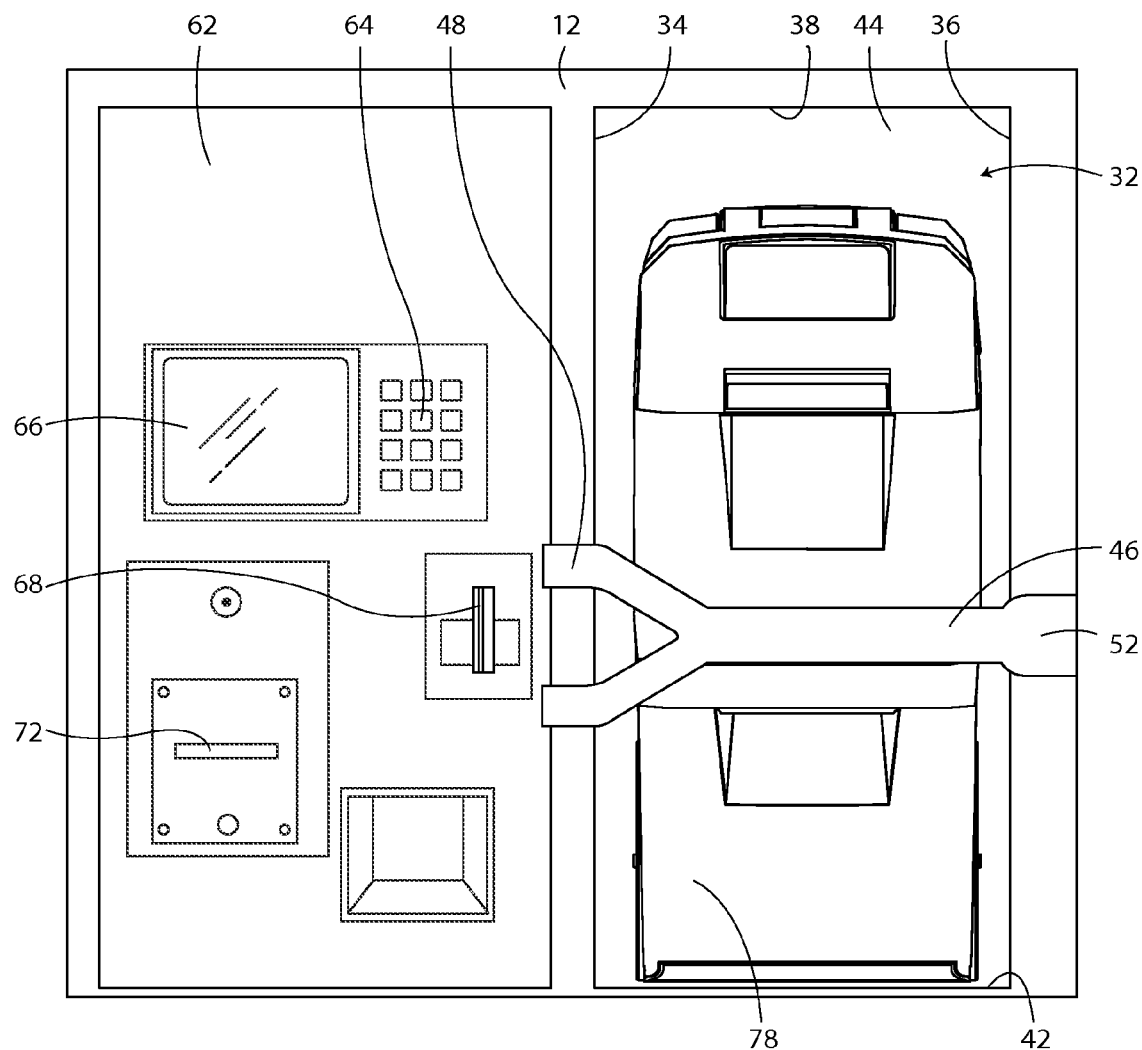
FIG. 2 is a partial view of a portion of the kiosk shown in FIG. 1, providing an enlarged view of the kiosk control panel and one of the kiosk stalls.
Figure 3:
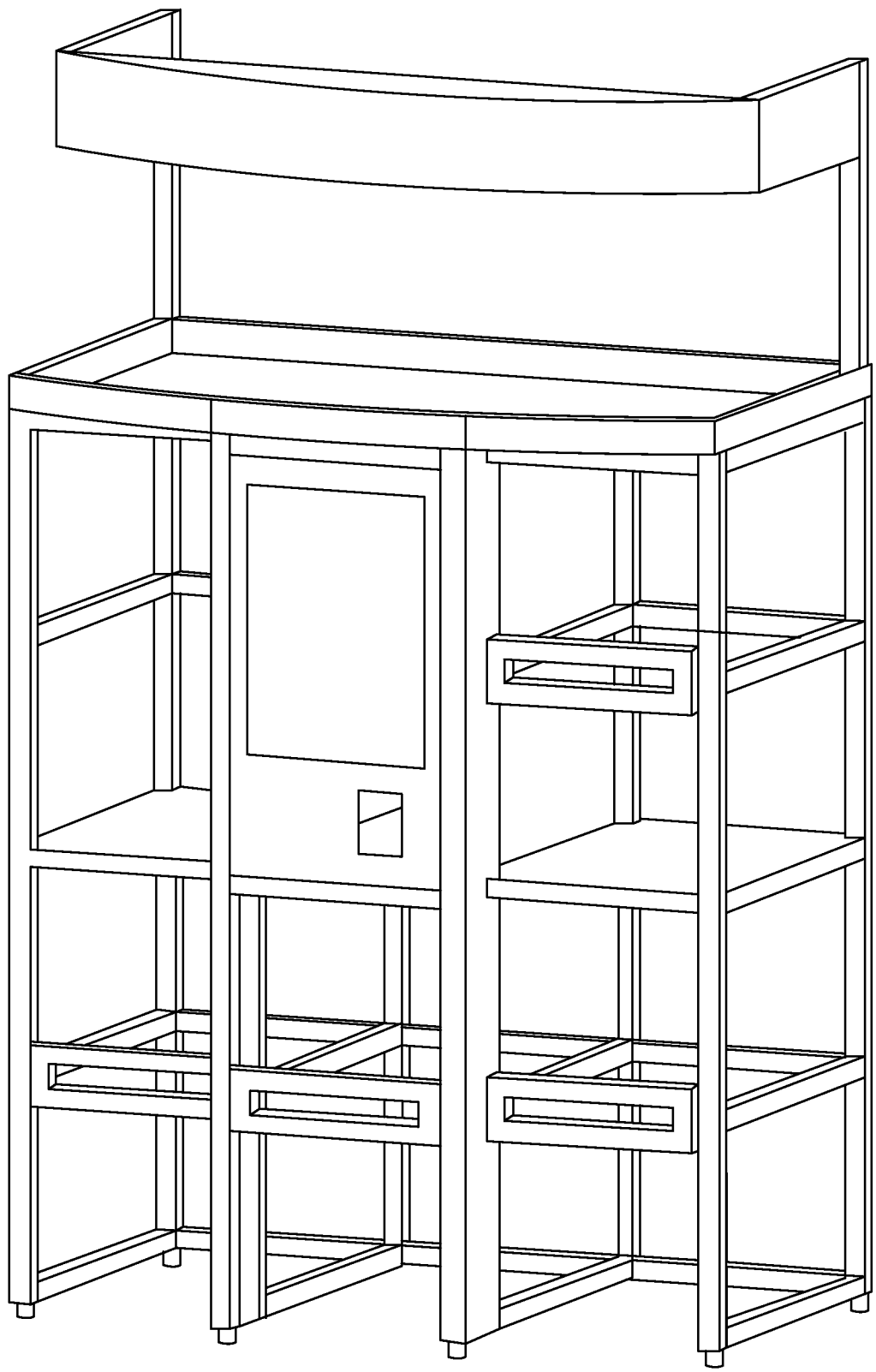
FIG. 3 is a front and right side perspective view of a frame of a carpet cleaning machine rental kiosk.

A control panel 62 is provided on the front of the kiosk 12. The control panel 62 has features that allow for the input of customer information into the control system of the kiosk 12 to conduct a rental transaction. In the embodiment of the kiosk 12 shown in FIGS. 1 and 2, the control panel 62 is provided with a keypad 64, a display screen 66, a credit card reader slot 68, and a printed receipt slot 72.

As shown in the figures, a carpet cleaning machine 78 can be positioned in each of the stalls 32 of the kiosk 12. With the gate 46 in its closed and locked position across the front of the stall 32 as shown in FIG. 1, the machine 78 cannot be removed from the stall 32. The carpet cleaning machine 78 preferably comprises wheels or rollers that allow the machine to be rolled out of the stall 32 across the stall bottom wall 42 when the gate 46 of the stall has been opened. To monitor the presence of the machine 78 in the stall 32, the stall is provided with a detection device (not shown), for example a barcode scanner, a RFID proximity sensor, a weight sensor, or an infrared beam sensor. The detection device allows the control system of the kiosk to detect the presence of the machine 78 in the stall 32, the removal of the machine 78 from the stall 32, and the return of the machine 78 to the stall 32. The kiosk 12 may also include sensors (not shown) that are operatively connected to the control system for detecting whether any gate or door is open or closed. Alternatively or in addition, the kiosk may also include mechanisms that allow the control system to automatically open or close the doors or gates.

Figure 4:
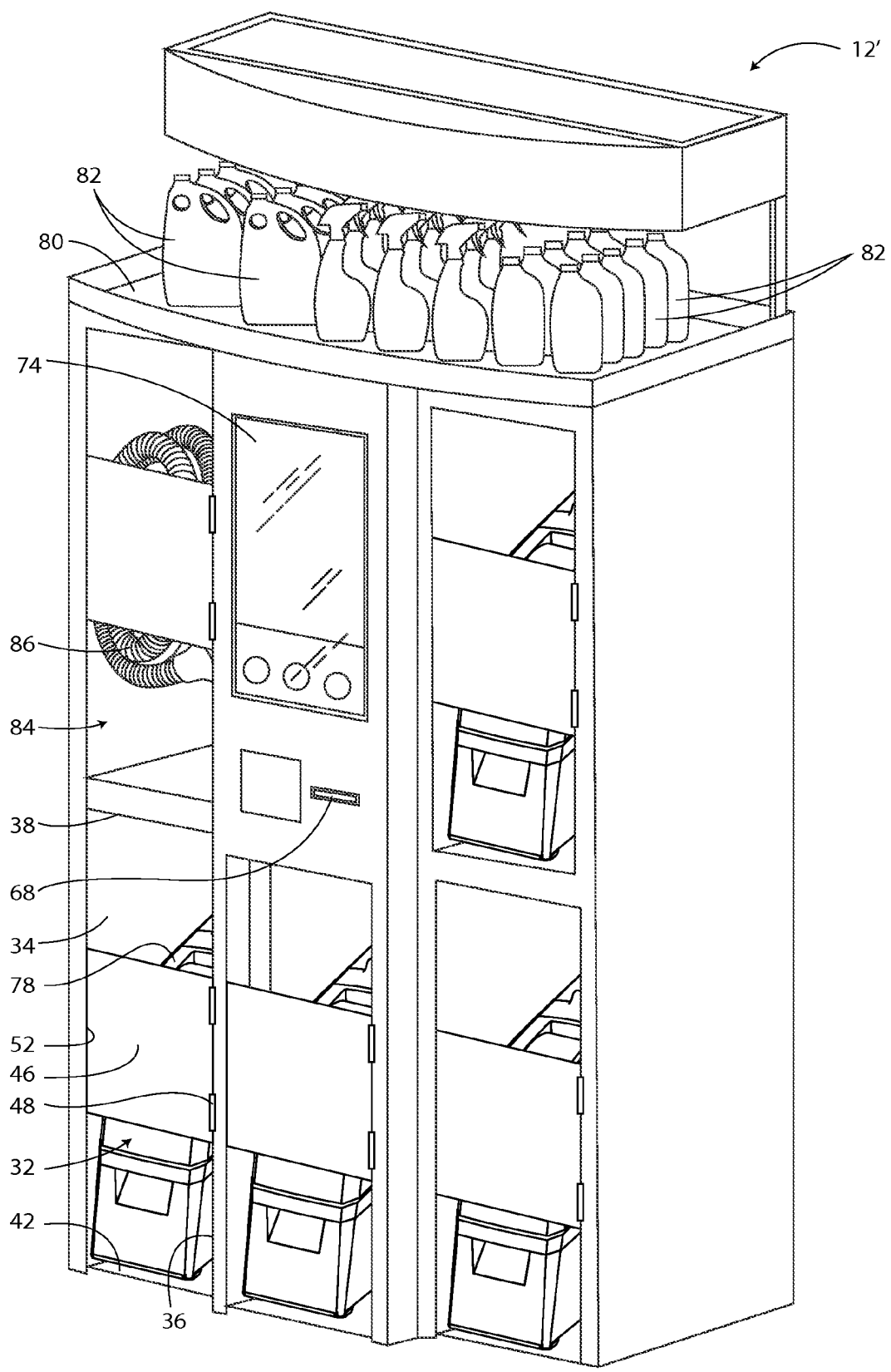
FIG. 4 is a front and right side perspective view of a carpet cleaning machine rental kiosk having a touchscreen and product display shelving.

In an alternate embodiment of the kiosk 12' (shown in FIG. 4), a touchscreen monitor 74 is provided in lieu of a keypad and display screen. An information scanner, for example a driver's license or credit card scanner 68, could also be provided in combination with a touchscreen 74. The kiosk 12' may also comprise display shelving 80. The display shelving 80 can be used to display cleaning products 82 that can be purchased at a store checkout line for use with the rented carpet cleaning machine. Alternatively, as discussed earlier, the kiosk could be provided with the robotic dispensing system for purchasing cleaning solution from the kiosk. In such an embodiment the customer would purchase the cleaning solution desired by using the control panel. The kiosk would have a robotic system that would position an empty container under a dispensing spout. The control system of the kiosk would then control the dispensing of the selected cleaning solution in the desired amount from the spout and into the container. When the dispensing is complete, the robotic system would then attach a cap on the container and present the container to the customer. Such a robotic system would eliminate the need for store shelves to display cleaning products and the need to restock display shelves. Still further, the kiosk 12' shown in FIG. 4 is also provided with a stall 84 for holding cleaning accessories that can be rented from the kiosk, for example a hand tool and connected hose 86 for cleaning stairs and furniture. The kiosk 12' shown in FIG. 4 may also include other components of the kiosk 12 shown in FIG. 1.

When operated, a kiosk could display a default display on its display screen 66 or touchscreen 74 for selecting a language for receiving further information. The default display could also include a suggested procedure of first purchasing cleaning products 82 at a store checkout line, and then proceeding to rent a carpet cleaning machine 78 from the kiosk. Still further, the default display could cycle through various screen shots or videos advertising the products offered and describing use of the devices and products.

When renting a carpet cleaning machine or cleaning accessory, or when purchasing cleaning solution dispensed by the kiosk, a customer initially interacts with the control panel (or touchlessly interacts with the control system) to initiate a transaction procedure. Information regarding the customer, the payment method, and the desired purchases or rentals is entered into the kiosk. The terms of the transaction can be displayed on the display screen or touchscreen. After confirming a transaction, the kiosk then releases the rented product(s) from the kiosk and/or dispenses the selected cleaning solutions. When releasing a carpet cleaning machine or accessory, the control system unlocks the locks of the gates or doors containing the products. The gates or doors that are unlocked can be indicated schematically on the display screen or touchscreen. Additionally, the doors or gates on the stalls could be spring-loaded in a manner such that they partially open upon being unlocked, thereby indicating which stall doors or gates have been unlocked by the control system. The customer can then open the doors or gates and remove the rented devices from the kiosk. As the customer removes a cleaning machine from a stall, the movement of the device is monitored by the detection device. After detecting the removal of a device from a stall, the control system may thereafter monitor whether each respective door or gate is still open. Once the gate is closed and the control system determines that the device has been removed from the stall, the control system of the kiosk may then activate the lock of the gate. The control system may also record information such as the date and time the device was removed from the kiosk.

When a rented device is returned by the customer to the kiosk, the return transaction is initiated by the customer via the control panel or touchlessly through the control system. The customer enters data sufficient for the control system to identify the particular rental transaction the customer previously entered. The control system may then determine whether the return deadline for the device or devices has been met. If it has not, the control system may then notify the customer of a late fee and request payment information or the control system may notify the customer that a late fee has been charged to credit card or other payment scheme initially used to rent the device. If the return deadline has not passed or after a late fee has been paid, the control system of the kiosk preferably unlocks the lock of the door to an appropriate stall or stalls. The control system of the kiosk preferably maintains the door lock in the unlocked condition until the detection device of a stall indicates that the device has been placed in the stall. When this condition is sensed by the detection device in the identified stall and control system determines that the door or gate of the stall has been closed, the control system of the kiosk then controls the door lock to lock. This provides the customer with ample opportunity to properly position the cleaning machine back into the identified stall before the door of the stall will lock in the closed position. Upon completing the return of a device or devices, the kiosk may then display confirmation of the termination of the rental agreement.

Of course, the control system of the kiosk can be configured to display to or request other information from the customer. For example, the control system could be configured to provide additional information or instructions in the event control system determines that the customer is not operating the kiosk properly. The kiosk may also send information via its communication system to provide electronic confirmation of rental transactions and returns to the customer through the remote processing system by, for example, email or text messaging.

In view of the foregoing, it should be appreciated that the present invention overcomes various disadvantages associate with prior art methods of leasing or purchasing or renting carpet cleaning machines and related items.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A self-service carpet cleaning machine rental kiosk comprising:
   a plurality of storage stalls, at least some of the storage stalls being each configured and adapted to contain at least one carpet cleaning machine, at least one of the storage stalls comprising at least one retaining mechanism that is configured and adapted to selectively prevent and allow the removal of a carpet cleaning machine from the kiosk;
   a control system, the control system comprising at least one user input device that is configured and adapted to receive rental data from a customer, the control system being configured and adapted to receive payment information from the customer, the control system being operatively connected to the retaining mechanism in a manner such that the control system can activate the retaining mechanism to allow a carpet cleaning machine to be removed from the at least one of the storage stalls, the control system also being configured and adapted to automatically charge a late fee to a customer's credit card in response to a carpet cleaning machine being placed into a stall after a predetermined time;
   at least one detection device, the detection device being adapted and configured to detect when a carpet cleaning machine has been removed from a stall of the kiosk, the detection device also being operatively connected to the control system in a manner such that the control system is responsive to whether a carpet cleaning machine has been removed from the at least one of the storage stalls of the kiosk and to whether a carpet cleaning machine has been placed into the at least one of the storage stalls of the kiosk after such a carpet cleaning machine was removed from the at least one of the storage stalls; and
   a communication system operatively connected to the control system, the communication system being adapted and configured to communicate with a remote processing system.

2. A kiosk in accordance with claim 1 comprising a control panel that is operatively connected to the control system, the control panel being configured and adapted to serve as an interface between the customer and the control system for inputting the rental data and payment information into the kiosk.

3. A kiosk in accordance with claim 2 wherein the control panel comprises a credit card reader.

4. A kiosk in accordance with claim 1 wherein the kiosk comprises at least one retaining mechanism that is controlled by the control system and that is configured and adapted to prevent unauthorized removal of a carpet cleaning machine from the kiosk and, alternatively, to permit removal of a carpet cleaning machine from the kiosk.

5. A kiosk in accordance with claim 4 wherein the retaining mechanism comprises a gate that is hinged to swing in a manner selectively opening and closing one of the machine storage stalls, the gate allowing removal of a carpet cleaning machine from said stall when the gate is opened, the gate preventing the removal of a cleaning machine from said stall when the gate is closed, the retaining mechanism also comprising a lock operated by the control system in a manner such that the control system can selectively secure the gate closed.

6. A kiosk in accordance with claim 5 wherein the control system is configured and adapted to operate the lock of the retaining mechanism in a manner such that the gate initially is closed and cannot be opened and thereafter can be opened, following which the control system operates lock of the retaining mechanism to secure the gate closed only after the control system determines via the detection device that a carpet cleaning machine has been removed from said storage stall of the kiosk.

7. A kiosk in accordance with claim 1 wherein at least one of the storage stalls is configured and adapted to contain a plurality of carpet cleaning machine accessories, said storage stall constituting an accessories storage stall, the kiosk comprising a plurality of accessory detection devices that are each adapted and configured to detect when a respective one of the carpet cleaning machine accessories has been removed from the accessories storage stall of the kiosk, the accessory detection devices also being operatively connected to the control system in a manner such that the control system is responsive to whether a carpet cleaning machine accessory has been removed from the accessories storage stall.

* * * * *